Patented Feb. 25, 1930

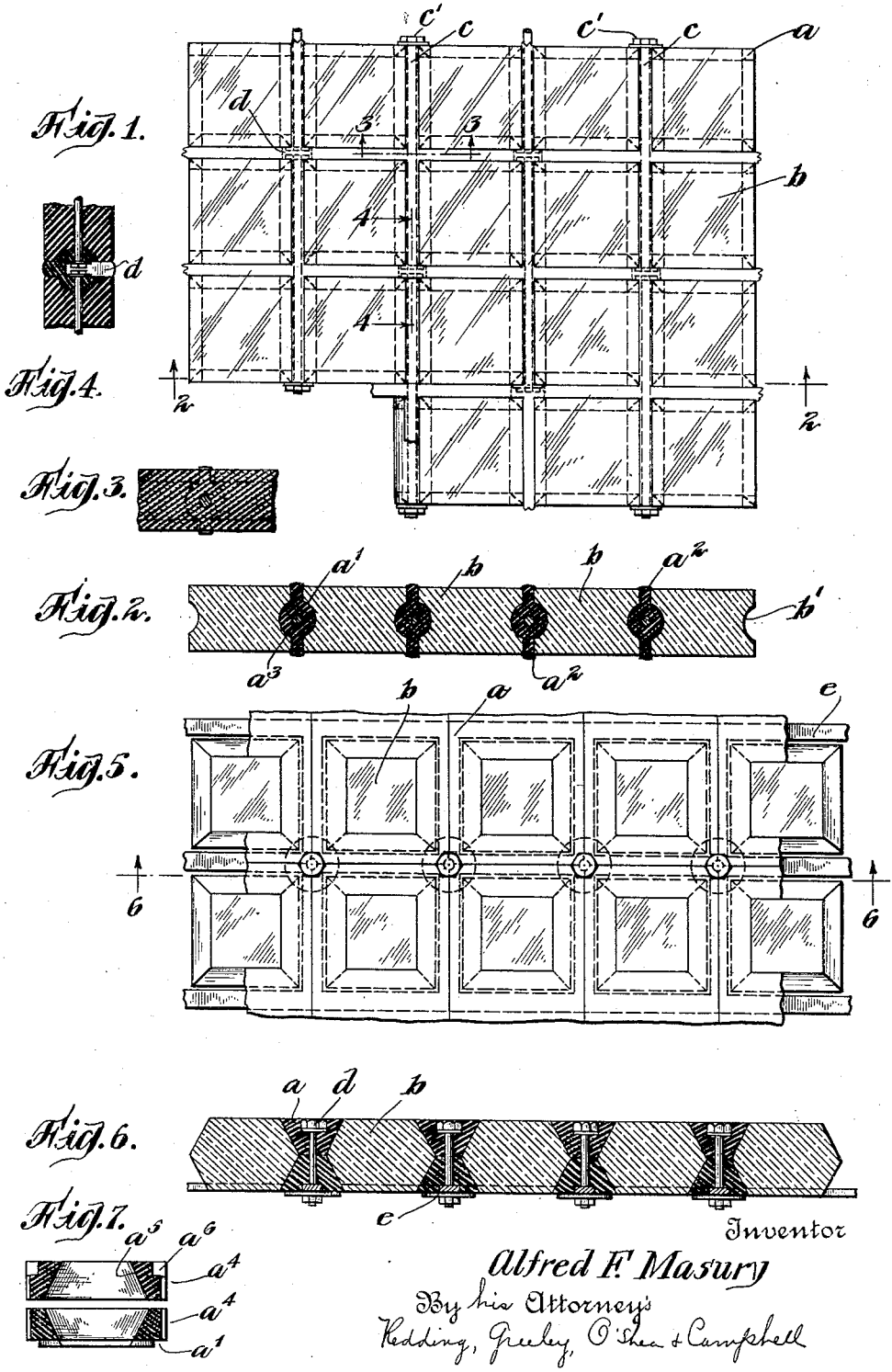

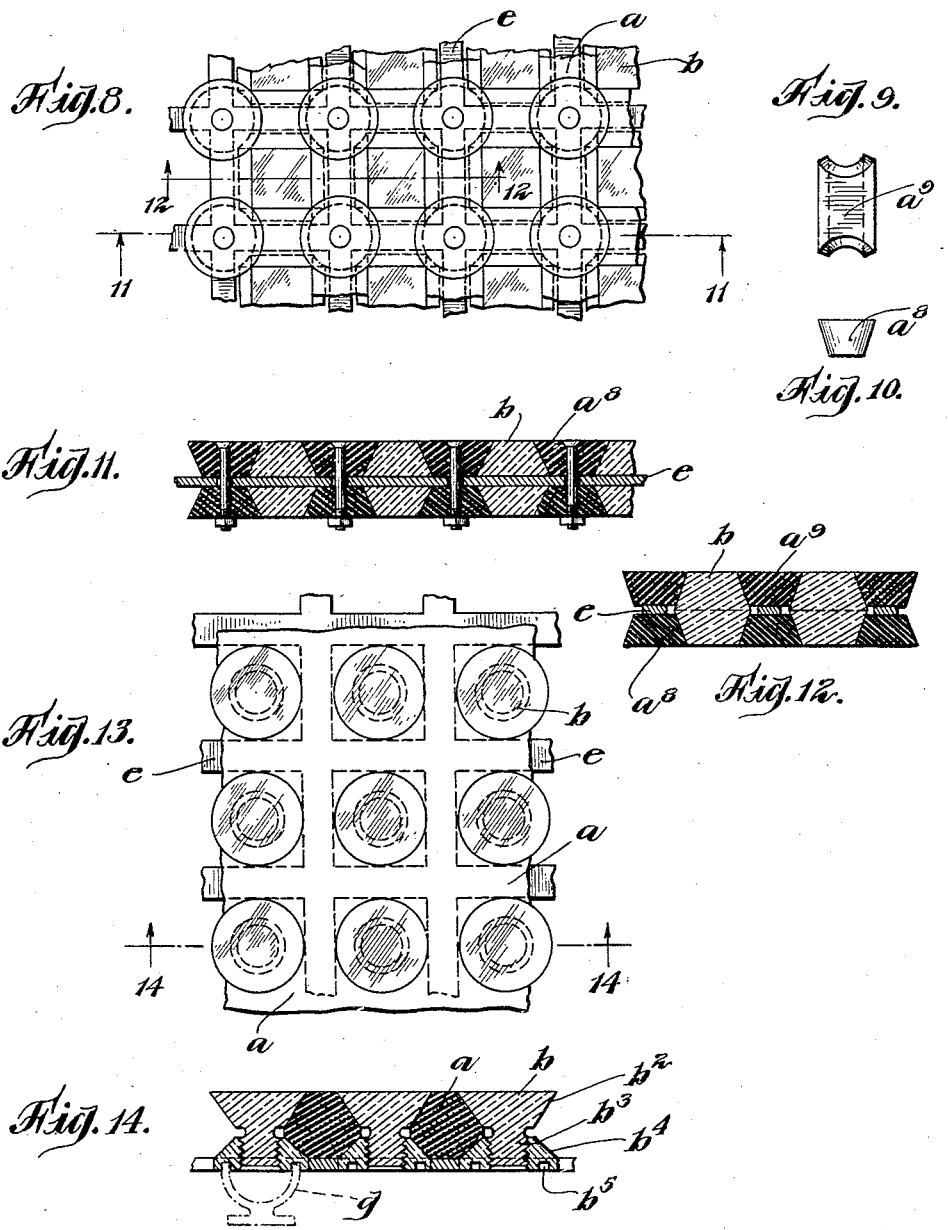

1,748,487

UNITED STATES PATENT OFFICE

ALFRED F. MASURY, OF NEW YORK, N. Y., ASSIGNOR, BY MESNE ASSIGNMENTS, TO THE RUBBER SHOCK INSULATOR CORPORATION, OF BRIDGEPORT, CONNECTICUT, A CORPORATION OF DELAWARE

RUBBER MOUNTING FOR GLASS FLOORS

Application filed January 17, 1927. Serial No. 161,493.

The present invention relates to methods of laying glass floors and sidewalks where a great number of transparent or translucent elements are secured together to constitute the surface, it being preferable, from the standpoint of serviceability to sectionalize the floor rather than use large areas of unitary glass portions.

As the desirability for floors of this type has increased, many systems have been devised to provide a surface which is easily laid, adapted to be repaired with facility, and has a life sufficient to justify extensive installations thereof. With few exceptions, existing systems involve the cementing of each glass bulls-eye in place and finishing off the surface with a suitable grouting. The resulting floors are characterized by being highly inflexible, capable of transmitting vibrations, slippery to walk on, and by being difficult to repair due to the manner in which the individual bulls-eyes are secured in position. The inflexibility causes the glass to be broken or cracked quite easily.

The present invention seeks to provide a floor having a surface adapted to permit light to pass therethrough but which possesses the qualities of flexibility, ability to deaden vibrations, ability to prevent slipping thereover, replaceability, and ability to preserve the life of the glass bodies.

The problem is approached by disregarding the orthodox requirement of rigidity and, instead, seeking a mounting which secures each bulls-eye in a universally yielding manner, thus substitutng a flexible construction for the existing rigid ones.

In order to set forth the invention more fully, reference will now be had to the accompanying drawings forming a part hereof, wherein:

Figure 1 is a plan view of a glass floor constructed according to the present invention.

Figure 2 is a section of the flooring taken on line 2—2 of Figure 1.

Figure 3 is a section taken on line 3—3 of Figure 1.

Figure 4 is a section taken on line 4—4 of Figure 1.

Figure 5 is a plan view of a glass floor also constructed according to the present inventon but in a modified form.

Figure 6 is a section of the modified form taken on the line 6—6 of Figure 5.

Figure 7 is a section of the rubber retaining means.

Figure 8 is a plan view of a second modified form of the invention.

Figures 9 and 10 are detail views showing the retaining sections.

Figure 11 is a section taken on line 11—11 of Figure 8.

Figure 12 is a section taken on line 12—12 of Figure 8.

Figure 13 is a plan view of a further modified form of the invention.

Figure 14 is a section taken on line 14—14 of Figure 13.

In the drawings $a$ represents the yielding, non-metallic, retaining means which, in the forms shown, comprises strips of rubber formed in the desired shape. The glass bulls-eyes $b$ are held in position and isolated from each other by the retaining means $a$ in a manner to be described later.

In Figures 1, 2, 3 and 4, the glass bulls-eyes $b$ are provided with grooves $b'$ along their sides and the rubber retaining strips $a$ are provided with cylindrical body portions $a'$ and vertical web portions $a^2$. The strips are placed between the respective blocks as shown clearly in Figure 2. The transverse strips are provided with axial hollow portions $a^3$ within which rods $c$ extend, the ends thereof being threaded. Longitudinal strips are provided with recesses $d$ which are adapted to receive nuts $c'$ screwed on the ends of the rods $c$. These recesses are spaced a distance of two bulls-eyes apart and are staggered in consecutive rows. The transverse vertical strips are of a length to fit between longitudinal strips spaced by two bulls-eyes and have ends formed as shown in Figure 4 which enable the transverse strips to fit into the longitudinal ones. The transverse longitudinal strips, being of the same length, are staggered with respect to parallel and adjacent rows and after the sections have been laid out the nuts $c'$ are tightened to place the rubber under a suitable compression and the unit is ready to be mounted.

In Figures 5, 6 and 7 a modified construction is shown wherein the retaining means takes the form of square hollow sections $a^4$ which have the inner sides thereof sloping outwardly as at $a^5$. The corners and vertical edges are cut away as at $a^6$ to receive bolts and nuts $d$. The glass and retaining sections are assembled upon a spider or frame $e$, the lower rubber sections being cut away as at $a^7$ to receive the frame. It will be apparent that this form is of particular merit in that a glass block may be replaced by simply removing a single retaining section and lifting it out.

Figures 8, 9, 10, 11 and 12 illustrate a further modification in which the frame $e$ is placed between the retaining sections. In this form these sections comprise truncated conical elements $a^8$ secured at the corners of the bulls-eyes by bolts $f$ passing axially through the elements and securing them to the frame. Intermediate strips $a^9$ having ends fitting under the conical sections, space the bulls-eyes apart. The sides of the bulls-eyes slope inwardly and the strips $a^9$ are formed to confine these sides between the upper and lower strips as shown in Figure 12.

In the form shown in Figures 13 and 14, the frame $e$ is used as in the form shown in Figure 5. In this case, however, the glass bulls-eyes are provided with tapered heads $b^2$ and threaded stems $b^3$ upon which tapered glass nuts $b^4$ are screwed. The rubber section $a$ is formed with openings, the sides of which slope outwardly and inwardly and receive the glass elements $b$. On the under faces the nuts are provided with spaced notches $b^5$ which receive a spanner wrench $g$ and enable the bulls-eyes to be secured in position. The nuts fit between the frame portion as shown in Figure 14.

It will be apparent from the above constructions that the floor is assembled very easily and likewise is adapted to permit the replacement of bulls-eyes with great facility. The manner of constructing the floor and the arrangement of the elements may be varied in many ways without departing from the scope of the invention, and it is not to be limited save as defined in the appended claims.

What I claim is:

1. A floor comprising a frame, opposed hollow rectangular blocks of rubber carried by the frame, bulls-eyes carried within the blocks, interengaging sides on the blocks and bulls-eyes, and means to secure the blocks to the frame under compression whereby the bulls-eyes will be secured in position.

2. A floor comprising a frame having rectangular openings, opposed hollow rectangular blocks of rubber carried by the frame, means on the lower blocks to fit within the openings, bulls-eyes secured between the blocks, interengaging tapered sides on the blocks and bulls-eyes, means at the corners of the blocks to receive securing means, and means positioned in such means to secure the blocks to the frame under compression, whereby the bulls-eyes will be secured in position.

3. A floor comprising a plurality of individual units, a plurality of sections of rubber confining the individual units therebetween, means cooperating with the individual sections to secure the same together under compression, and interlocking formations on the units and sections, whereby the units may be removed individually from their secured position.

4. A floor comprising a plurality of individual units, rubber between the units, means including the rubber to secure the units together, and means to adjust the last named means to place the rubber under a predetermined degree of compression.

5. A floor comprising a plurality of bulls-eyes, sections of rubber disposed therebetween, means to secure the bulls-eyes in position, and interlocking formations on the sections and bulls-eyes, the securing means including means to cause the sections of rubber to be clamped together under compression.

6. A floor comprising a frame, rubber carried by the frame, bulls-eyes carried by the rubber, and means to secure the bulls-eyes, rubber and frame together with the rubber under compression.

This specification signed this 13th day of January, A. D. 1927.

ALFRED F. MASURY.